UNITED STATES PATENT OFFICE.

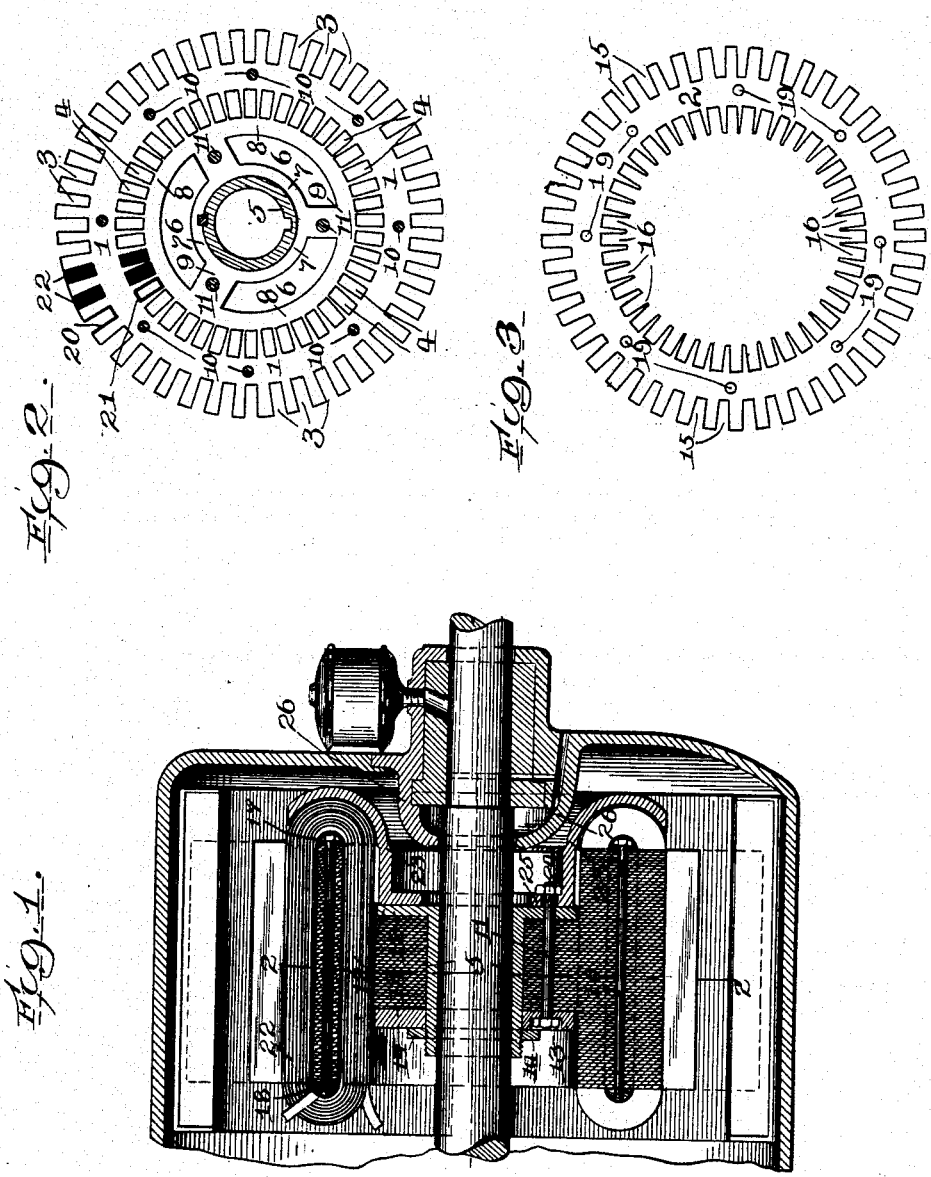

CHARLES DE WITT ANDERSON, OF CHICAGO, ILLINOIS.

ARMATURE FOR DYNAMO-ELECTRIC MACHINES.

SPECIFICATION forming part of Letters Patent No. 677,392, dated July 2, 1901.

Application filed August 27, 1900. Serial No. 28,154. (No model.)

*To all whom it may concern:*

Be it known that I, CHARLES DE WITT ANDERSON, a citizen of the United States, residing at Chicago, in the county of Cook and State of Illinois, have invented certain new and useful Improvements in Armatures for Dynamo-Electric Machines, of which the following is a specification.

In the accompanying drawings, which are made a part of this specification, Figure 1 is an axial section of an armature embodying the invention and of a portion of the casing therefor, a portion of the armature-shaft being shown in elevation. Fig. 2 is a transverse section thereof on the line 2 2, Fig. 1, nearly all of the coils and the insulators by which they are separated from the core being omitted. Fig. 3 is a face view of a stamped sheet-metal ring that may be used in the construction of the armature-core where it is desired that the armature shall have overhanging ends projecting beyond the centrally-located support or spider.

The ring or core proper and the spider or equivalent means for supporting it are in accordance with the present invention made up of a number of stamped sheet-metal disks 1, such as shown in Fig. 2; to which may be added, if desired, a number of stamped sheet-metal rings 2, such as shown in Fig. 3. Each of the disks 1 has in its periphery radial notches 3 and has also perforations or openings 4, corresponding in width and radial disposition with the notches 3 and arranged in a circular series concentric with the disk, the disk being provided with a central opening adapted to receive the armature-shaft or, preferably, a sleeve 5, secured to it. That portion of the disk lying within the circular series of openings 4 is preferably provided with openings 6, which reduce it in form to two concentric rings 7 and 8, connected by radial arms 9. That portion of the disk lying between the notches 3 and the circular series of openings 4 is provided with equidistant perforations for the passage of tie-bolts 10, and that portion lying within the circular series of openings is provided with equidistant perforations for the passage of tie-bolts 11.

In order to build up an armature-core and spider of stampings having the features above described, the desired number of them is assembled so that the notches 3 and openings 4 register, thus forming a composite or laminated disk or cylinder having in its periphery a number of longitudinal grooves resulting from the notches 3 and having through it a number of longitudinal openings or passages resulting from the openings 4. The disks are preferably assembled on the sleeve 5, which has at one end a radial flange 12, and onto this sleeve is slipped a ring 13, the flange 12 and ring 13 being provided with properly-disposed openings for the reception of the tie-bolts 11, by which the flange 12 and ring 13 are drawn together, so as to firmly clamp and hold together the central portions of the several disks. In order to still more securely hold the parts together, and especially to prevent the bolts 11 from working loose, the sleeve 5 is threaded, and onto this threaded portion is turned a nut 14, of sufficient diameter to overlap the heads of the bolts which are countersunk in the ring 13.

If desired, the entire core from end to end may be made up of disks, such as shown in Fig. 2, but I prefer to use in connection with them a number of rings, such as shown in Fig. 3. Each of these rings is provided in its periphery with a series of notches 15, corresponding in size and radial disposition with the notches 3, and is provided also in its inner margin with a number of notches 16, corresponding in width and radial disposition with the openings 4. Where it is desired to extend the core longitudinally beyond the spider resulting from those portions of the disks 1 that lie within the circular series of openings 4, the appropriate number of rings 2 are assembled upon each side of the spider, so that their notches 15 and 16 register with the notches 3 and openings 4, respectively. The core being thus built up to the desired longitudinal extent rings 17 and 18 are placed against the outermost rings 2, and the tie-bolts 10 are passed through the disks 1 and rings 2, the latter being provided with perforations 19 for receiving them. Preferably the bolts 10 pass freely through perforations in the ring 17 and are threaded into the ring 18, the threaded end of the bolt being dressed off so that it does not project beyond the outer surface of the ring 18, the heads of the bolts being countersunk in the ring 17, so as not to interfere with the winding. In the peripheral grooves of the core thus constructed are placed insulating-troughs 20, and in the passage resulting from the openings 4 are placed insulating-sleeves 21, which troughs and sleeves may be made of any suitable insulating material, such as mica, micanite, or packing. The core is then ready for the reception of the coils 22, each of which is entirely separate and independent of every other, excepting as they are related through the commutator. Each of these coils consists of a single length of insulated metallic ribbon wound the necessary number of times around the core and having projecting ends of sufficient length to form the commutator connections. In winding this coil the ribbon is started at the ring 18 and laid along the groove to the opposite end thereof, at which point its end is inserted through the corresponding passage resulting from the openings 4 and notches 16, returning to the starting-point and repeating this operation until the winding is complete. At the commencement of the second convolution or layer the first laid end of the ribbon is twisted, so as to bring it to one side of the coil and allow the other layers or convolutions to be laid flat one upon another.

For the purpose of preventing oil from the armature-shaft from getting onto the coils, a cup-shaped shield 23 is secured to the armature by means of the bolts 11 and nuts 24 turned onto them, the bolts being made of sufficient length to pass through threaded openings in the flange 12 and also through a flange 25 of the shield 23. This overhanging form of the armature is advantageous in that it provides ample ventilation and enables the journal-box 26 of the armature-shaft to be projected inward, thus enabling the use of a shaft of minimum length.

What I claim as new, and desire to secure by Letters Patent, is—

1. An element for use in the construction of armatures consisting of a disk having in its periphery a number of notches and having also a number of openings arranged in a circular series concentric with its axis and corresponding in number and radial disposition with said notches, substantially as set forth.

2. An element for use in the construction of armatures consisting of a disk having in its periphery a number of notches and having also a central opening and between said notches and opening a circular series of openings corresponding in number and radial disposition with said notches, substantially as set forth.

3. An element for use in the construction of armatures consisting of a disk having in its periphery a number of notches and having between its periphery and its center a number of openings corresponding in width and radial disposition with said notches, substantially as set forth.

4. An element for use in the construction of armatures consisting of a disk having a central opening, a number of openings arranged equidistant in a circular series concentric with said central opening, and a number of equidistant peripheral notches corresponding in width and radial disposition with the openings of the circular series aforesaid, substantially as set forth.

5. An element for use in the construction of armatures consisting of a disk having a series of peripheral notches, a number of openings arranged in a circular series concentric with the disk, a central opening, and openings between said central opening and the circular series of openings, substantially as set forth.

6. An armature having a laminated core and a spider supporting it, said core and spider comprising a number of similar disks each having a number of peripheral notches and a number of openings arranged in a circular series concentric with the disk corresponding in number and radial disposition with said notches, and means for securing said disks together so that the peripheral notches and the openings register, substantially as set forth.

7. An armature having a laminated core and a spider for supporting the core, said core and spider comprising a number of disks, each having a number of equidistant peripheral notches and a number of openings corresponding in width and radial disposition with said notches, and means for securing the several disks together so that the notches and openings register, substantially as set forth.

8. An armature having a laminated core comprising a number of disks, each having a number of peripheral notches and a number of openings arranged in a circular series concentric with the disk, means for securing said disks together with their notches and openings registering so that the notches form longitudinal grooves in the periphery of the core and the openings form longitudinal passages through the core, and coils wound longitudinally through the grooves and passages, substantially as set forth.

9. An armature having a laminated core comprising a number of disks, each having a number of peripheral notches and a number of openings arranged in a circular series concentric with the disk, and corresponding in number and radial disposition with said notches, means for securing said disks together with their notches and openings registering so that the notches form longitudinal grooves in the periphery of the core and the openings form longitudinal passages through the core, and coils wound longitudinally through the grooves and passages, substantially as set forth.

10. An armature having a laminated core made up of a number of disks and a number of rings, each of the disks having in its periphery a number of notches and having also a number of openings arranged in a circular series concentric with the disk and each of the rings having a number of peripheral notches corresponding with the peripheral notches of the disks, means for securing said disks and rings together so that their peripheral notches register and form longitudinal grooves in the core, the rings being arranged upon both sides of the disks, and coils wound longitudinally through said grooves and openings, substantially as set forth.

11. An armature having a laminated core comprising a number of disks and a number of rings, each of the disks having a number of peripheral notches and a number of openings arranged in a circular series concentric with the disk, and each of the rings having in its periphery a number of notches corresponding with the notches of the disks and in its inner margin a number of notches corresponding with the openings of the disks, means for securing said disks and rings together so that the peripheral notches register and form longitudinal grooves in the periphery of the core, while the openings register and form longitudinal passages through the core, and coils wound longitudinally through the grooves and passages, substantially as set forth.

12. An armature having a core and a support therefor, comprising a number of disks, each having a series of equidistant peripheral notches and a circular series of openings corresponding in width and radial disposition with the notches, a series of rings disposed upon both faces of the assembled disks, each of said rings having a series of peripheral notches corresponding in width and radial disposition with the peripheral notches of the disks and having also in its inner margin a series of notches corresponding in width and radial disposition with the openings of the disks, and means for securing the disks and rings together, substantially as set forth.

13. An armature having a core and a support therefor, the core being extended at both ends beyond said support, and a cup-shaped shield located within one of the overhanging ends of the core and projecting beyond said end, substantially as set forth.

14. An armature having the sleeve 5, a number of disks 1, each having a central opening in which said sleeve fits and each having a number of peripheral notches and a number of openings corresponding in width and radial disposition with said notches, said disks being arranged with their similar features registering, means for securing the disks to the sleeve 5, a number of rings 2 having notches 15 and 16 registering with the notches and openings aforesaid of the disks, and means for securing the disks and rings together, substantially as set forth.

CHARLES DE WITT ANDERSON.

Witnesses:
J. HENRY LEWIS,
L. M. HOPKINS.